Jan. 20, 1959  N. H. WILLIAMS ET AL  2,869,991
APPARATUS INCORPORATING A VIBRATING GRATE
Filed Aug. 23, 1954  2 Sheets-Sheet 1
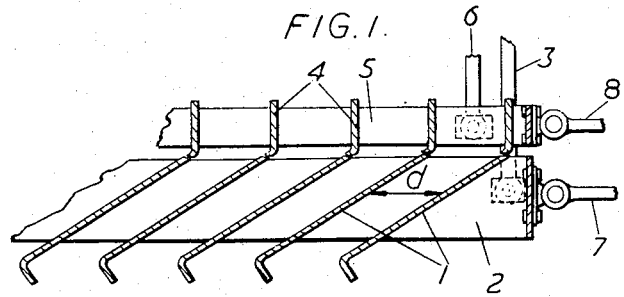
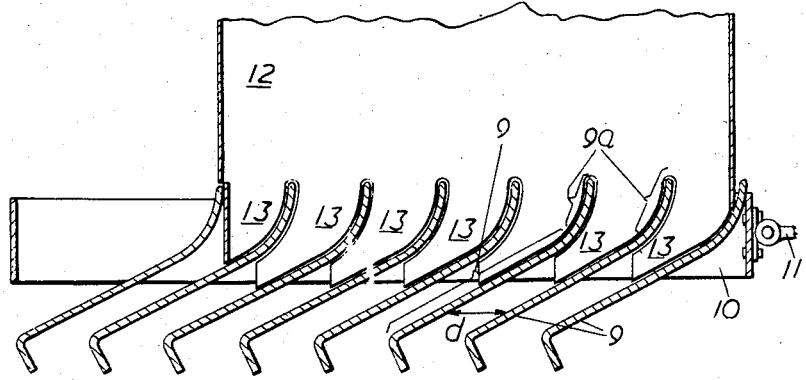
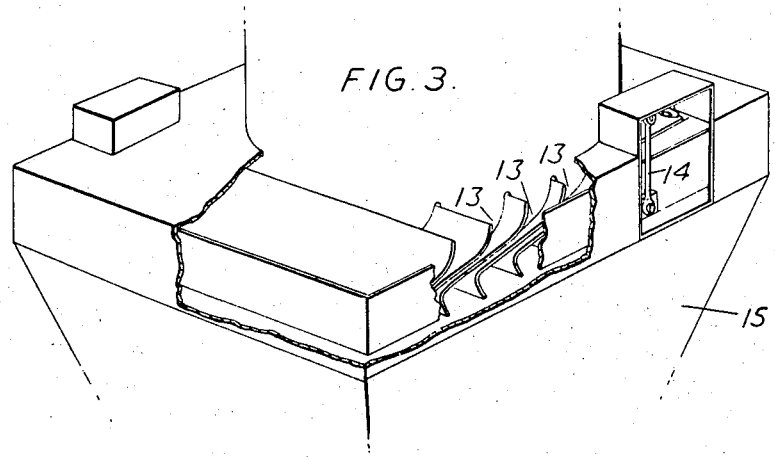
Inventor
NORMAN H. WILLIAMS &
CHARLES T. HAWKES
Attorneys

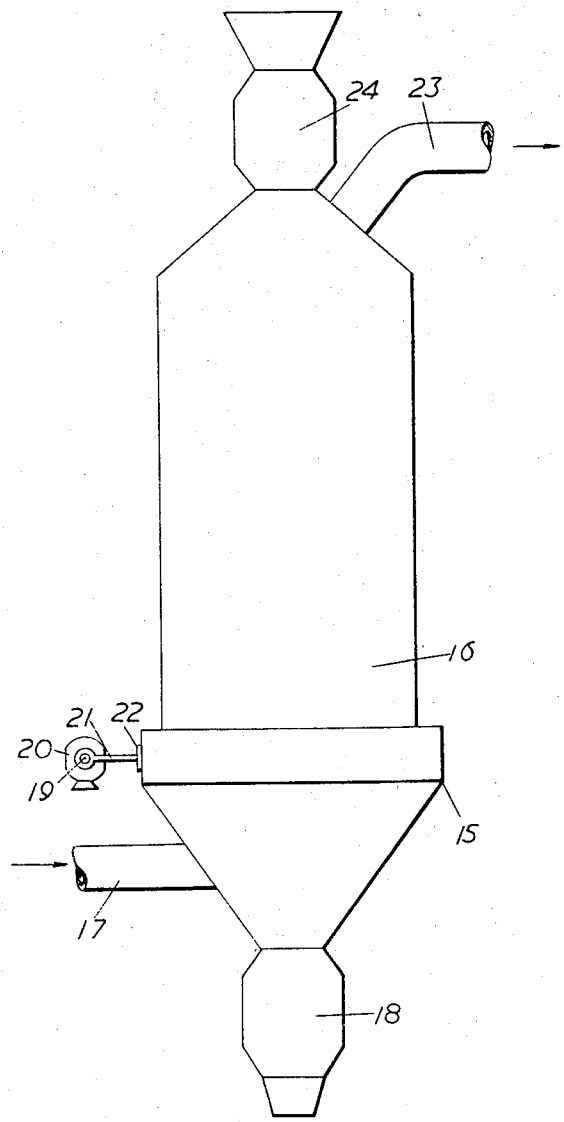

United States Patent Office 2,869,991
Patented Jan. 20, 1959

2,869,991

APPARATUS INCORPORATING A VIBRATING GRATE

Norman Henry Williams and Charles Trevor Hawkes, London, England, assignors to Humphreys & Glasgow Limited, London, England, a British company Application August 23, 1954, Serial No. 451,631

Claims priority, application Great Britain August 27, 1953

12 Claims. (Cl. 23—284)

This invention relates to a grate for supporting a bed of solids to be contacted with a fluid with the object of reacting the fluid, or a constituent or constituents thereof, with the material of which the bed is composed, or with a constituent or constituents thereof; also to physically treating the fluid with the solids or vice versa.

The invention is more particularly concerned with a grate adapted to induce the controlled discharge of the solids evenly over the whole of the underside of a supported bed thereof while allowing simultaneous and uninterrupted passage of the fluid through the grate and through the bed of solids above it.

In copending British patent application No. 24,443/50 (702,529) we have already described a grate for supporting a bed of solids to be contacted with a fluid which grate comprises a plurality of grate members disposed with those portions of their upper surfaces on which the solids repose sloping but inclined at an angle less than the angle of rest of the said solids, said grate members being so distanced from adjacent grate members that the portions of adjacent grate members on which the solids repose overlap to an extent which prevents free passage of the said solids through the grate while the grate members are static and means for vibrating, jarring or shaking the grate members to cause solids resting thereon to be moved down the sloping surfaces of the individual grate members so as to pass between adjacent members and fall from the lower edges of said sloping surfaces. In the preferred form of grate described therein the said members are in the form of flat bars which may be stiffened by means of flanges or beads formed along their lower edges.

According to this invention there is provided apparatus for supporting a bed of solids to be contacted with a fluid which comprises a grate having a set of generally flat bars mounted substantially parallel with their upper surfaces sloping but inclined to the horizontal at an angle less than the angle of repose of the solids to be supported and have a ratio of width to pitch (i. e. the horizontal distance between corresponding points of adjacent bars) which allows free access of the said solids into the spaces between the bars but which is at least sufficient to prevent free passage of the said solids through the spaces between the bars while the grate part is static, a limited-support part having a plurality of slats mounted to define therebetween a series of channels substantially parallel with the bars of the grate part and having their sides inclined at an angle to the horizontal substantially greater than the angle of repose of the said solids, and vibrator means for vibrating the grate part and for vibrating the limited-support part at frequencies within the range required to induce flow of the said solids through the spaces between the bars of the grate part.

The slats of the limited-support part may be separate from the bars of the grate part or they may be attached to the said bars or be integral with the said bars.

Where the slats are separate from the bars, the slats and the bars may be mounted in co-operative relationship either in a single frame or in separate frames. The slats need not necessarily be spaced the same distance apart as the bars nor need each slat necessarily be arranged in alignment with the top edge of a bar. If the slats and bars are mounted in separate frames, the limited-support part may be vibrated together with the grate part or separately therefrom. In the latter case the limited-support part and the grate part need not necessarily be given the same amplitude or the same frequency.

In a preferred arrangement, the bars and the slats are together provided in the form of a plurality of members having generally flat bar parts attached to, or more preferably integral with, slat parts, the slat parts and the bar parts of said members being sloped to meet in a smooth curve. With this arrangement sharp angles, which tend to leave dead spaces in which material can collect and remain undisturbed, are avoided particularly if the smooth curves extend substantially throughout the whole depths of the slat parts.

It will be understood in connection with the said members that a bar portion ends and a slat portion commences where the curvature on the upper surfaces of a member produces a slope which equals the angle of repose of the particulate solids.

Whatever construction is adopted, the upper edges of the slat part are preferably directed vertically upwards. The optimum vertical height of the slats will depend upon the nature of the particular solids to be handled but will generally be within the range of from 0.25 $d$ to $d$ where $d$ is the pitch of the bars as defined above.

We have found that the provision of the slats as defined above promotes uniform feeding of the solids, even in the case of iron oxide gas purification material containing wood chips, through the spaces between the grate bars. This is probably because the slats give limited but sufficient support to the particulate solid material above the grate bars to prevent its packing and consolidation in the entry spaces between the bars, and while it is to be understood that we do not wish to be limited by any theory as to its function we have for convenience used the term "limited-support part" to define this section of the apparatus.

If voids are not to be produced at the junction of the grate with the container, it is essential to ensure that no sideways leakage of particulate solids can occur there.

To this end, it is within the scope of the present invention to arrange that the grate part forms the bottom closure for the vessel containing the bed of solids but extends beyond the walls of the vessel which walls are provided with sideways-leakage sealing projections which extend downwardly into the spaces between the bars and which are shaped and dimensioned to permit the required vibratory movements of the grate bars while yet preventing substantial sideways leakage of solids at the edges of the projections.

The following is a description by way of illustration only of embodiments of the invention with reference to the accompanying drawings in which:

Fig. 1 is a section of part of a construction with slats that are separate from the grate bars.

Fig. 2 is the section of the bottom of a container with a grate having the slats formed as upward extensions of the grate bars themselves.

Fig. 3 is a part-sectional perspective view of the invention applied to the purification of gases in apparatus of the type shown diagrammatically in outline in Fig. 4.

Referring to Fig. 1 the grate part comprises a number of metal bars 1 which are secured to opposite sides of a frame 2 so as to extend across it substantially parallel with each other and with their upper surfaces inclined at an angle to the horizontal which is less than the angle of repose of the solids to be supported on the grate, the angle of repose being the angle of repose after the solids have been vibrated. The bars are spaced evenly apart but with an overlap that is at least sufficient to prevent free passage of solids through the spaces when the grate is static.

A series of metal slats 4 is secured to opposite sides of a second frame 5 which is of approximately the same size as the lower frame 2 so as to form a number of substantially vertical parallel walls across the frame 5 there being the same number of slats as there are bars in the frame 2 spaced apart so that their lower edges are approximately in line wtih the upper edges of the grate bars but hang clear of them when the two frames are suspended for operation on hangers 3 and 6 (only one of each set of 4 hangers being shown in Fig. 1).

The slats 4 have a vertical height approximately equal to the pitch "$d$" of the grate bars 1 and conveniently are of the same thickness as the bars, and the lower edges of the bars are stiffened by a flange as shown.

The two frames 2 and 5 may be connected to two separate oscillating means (not shown) by connecting arms 7 and 8 respectively, and be vibrated independently and at different frequencies and/or amplitudes, or they may be vibrated simultaneously and in like manner, the connecting arms 7 and 8 then linking the frames 2 and 5 to a single oscillating means, or the arms 7 and 8 may be replaced by a single connecting arm attached to both the frames 2 and 5 and to a single oscillating means.

Referring to Fig. 2 the composite grate members 9 which have each of them an upwardly extending portion 9a and a lower mainly flat portion 9b are fastened to opposite sides of a rectangular frame 10 substantially parallel across the full width of the frame and inclined so that the upper surfaces of the portions 9b are sloping at an angle to the horizontal less than the angle of repose of the solids after they have been vibrated to be supported on the grate. The width of the members and their pitch "$d$" are such that there is overlap at least sufficient to prevent free flow of the solids out between the bars when the grate is static.

The portions 9a of the members 9 project vertically upwards for a distance approximately equal to $d$, the surfaces of these portions which are continuations of the upper surfaces of the portions 9b being at an angle to the horizontal which is greater than the angle of repose of the solids after they have been vibrated being handled.

By means of the pivoted connecting arm 11 linked to an oscillating means (not shown) the grate may be vibrated at the desired frequency and amplitude intermittently or continuously.

To prevent sideways leakage of the solids at the bottom of the container 12 this is provided with downward projections 13 of its walls into the spaces between the members 9 there being sufficient clearance between the members 9 and the projections 13 to permit vibration of the grate as desired without sideways leakage of the solids at the edges of the projections.

In Fig. 3 the projections 13 are shown in perspective. Also shown in Fig. 3 is one of the four hangers 14 by means of which the grate is suspended for operation. The whole grate assembly may then be enclosed in a surrounding chamber 15 which may be made gas-tight for instance to prevent escape to atmosphere of gas when the invention is used in a process for purifying gas with iron oxide gas purification material.

In such a case, apparatus of the type shown in Fig. 4 may be used, the grate being enclosed in the chamber 15 which at its top has a gas-tight junction with the container 16 and is provided below with an inlet 17 for foul gas and double valved chamber 18 for withdrawal of fouled purification material. The grate, which is of the form shown in Figs. 2 and 3 is oscillated at the desired frequency and amplitude by the eccentric 19, motor 20 and connecting arm 21, there being a flexible gas-tight panel 22 provided in the wall of the chamber 15 for this purpose. The container 16 for the bed of purification material have an outlet 23 near the top for purified gas and a double valved chamber 24 for introduction of fresh or revivified purification material.

With regard to the frequency and amplitude of vibration of the grate we have found for instance when operating a grate of the type illustrated in Figs. 2 and 3 with conventional iron oxide gas purification material incorporating wood chips that the minimum frequency giving a satisfactory discharge is about 500 cycles per minute when the moisture content of the purification material is about 15% but somewhat higher if the moisture content is substantially above 15%. Below this minimum frequency there is a fairly abrupt cessation of flow through the grate but above it the rate of flow is substantially proportional to the frequency. Provided the slope of the bars is such that the upper surface of the grate bar portion is inclined to the horizontal at an angle less than the angle of repose of the purification material after vibration of the material and provided there is sufficient overlap of the bars to prevent free flow of solids through when the grate is static the minimum frequency stated above is substantially independent of the angle of inclination of the bars or of their spacing apart or of details of shape of the upward projections or slat portions.

We have found amplitudes of vibration of from $\frac{1}{50}$ to $\frac{1}{16}''$ to be satisfactory for operating a grate of the form shown in Figs. 2 and 3 with conventional iron oxide purification material, and although larger amplitudes may be employed with a consequential greater rate of flow of solids per unit of grate area, we prefer to use amplitudes of the order stated above on account of the rapid increase in power with increase in amplitude and the resulting necessary increase in strength of the driving unit.

We claim:

1. Apparatus for providing a bottom support for a bed of solids to be contacted with a fluid which apparatus comprises a hopper, a frame mounted on the bottom of said hopper for reciprocal movement laterally of said hopper, a plurality of profiled members immovably secured in mutually parallel relationship across said frame each of said profiled members being profiled to provide a lower, generally flat, grate bar and an upper limited-support slat, surmounting said grate bar the portion of said profiled member constituting said grate bar being inclined to the horizontal at an angle less than, and the portion of said profiled member constituting said limited support slat being inclined to the horizontal at an angle greater than, the natural angle of repose after they have been vibrated of the solids to be supported, said profiled members being spaced apart a distance which is sufficient to allow said solids to fall onto said grate bars and which is insufficient to allow said solids a free passage between the grate bars while the grate bars are stationary, and said limited support slat having a vertical height of from distance between the profiled members to the distance between said grate bars, and vibrator means for vibrating the frame and the profiled members relative to said hopper at a frequency within the range required to induce passage of said solids between the grate bars.

2. Apparatus according to claim 1 in which the profiled members have the lower edges of the grate bars bent downwardly for reinforcing said edges.

3. An apparatus for providing a bottom support for a bed of solids to be contacted with a fluid, comprising a hopper for the bed of solids, a grate part comprised of a set of bars having substantially flat upper surfaces, the bars of said set being substantially parallel and the flat upper surfaces of the bars sloping at a fixed inclination to the horizontal and being fixed in spaced relationship to each other with a ratio of width in the direction of slope to the horizontal spacing between bars which is sufficiently large to permit said solids to fall onto said bars but which is sufficiently small to prevent passage of said solids between said bars when the solids are resting at their natural angle of repose, and a limited support part comprising a plurality of slats mounted parallel to each other defining between them a plurality of channels lying above and extending into the spaces defined between the bars of said grate part, at least the upper portion of said slats being substantially vertical for extending upwardly into the bed of solids, and at least one frame on which said bars and said slats are fixed in position and maintaining the positions of said bars and slats fixed relative to said frame at all times, said apparatus further comprising means for vibrating the said frame grate part relative to said hopper and the limited support part at a frequency within the range required to induce passage of the solids between the bars of said grate part.

4. An apparatus as claimed in claim 3 in which each of said slats joins one of said bars in a smooth curve.

5. Apparatus according to claim 3 in which the slats and the bars are formed integrally with one another and are held in a single frame.

6. Apparatus according to claim 3 in which the slats and the bars are formed separately from one another and are held in two separate frames.

7. Apparatus according to claim 4 in which the said smooth curves extend upwardly over the whole depth of the slats.

8. Apparatus according to claim 4 in which the said slats are continuously curved throughout their depth and are substantially perpendicular to the horizontal at the upper edges.

9. An apparatus for supporting a bed of solids to be contacted with a fluid comprising a hopper, a bottom closure structure closing the bottom of said hopper and projecting outwardly around the bottom of said hopper, said bottom closure comprising a grate part comprised of a set of bars having substantially flat upper surfaces, the bars of said set being substantially parallel and the flat upper surfaces of the bars sloping at a fixed inclination to the horizontal and being fixed in spaced relationship to each other with a ratio of width in the direction of slope to the horizontal spacing between bars which is sufficiently large to permit said solids to fall onto said bars but which is sufficiently small to prevent passage of said solids between said bars when the solids are resting at their natural angle of repose, and a limited support part comprising a plurality of slats mounted parallel to each other defining between them a plurality of channels lying above the bars of said grate part, at least the upper portion of said slats being substantially vertical for extending upwardly into the bed of solids, and at least one frame on which said bars and said slats are fixed in position and maintaining the positions of said bars and slats fixed relative to said frame at all times, lateral leakage sealing projections extending downwardly from said hopper and projecting between said bars and permitting vibratory movement of said bars and preventing substantitally lateral leakage of the solids, and means for vibrating said bottom closure structure relative to said hopper at a frequency within the range required to induce passage of said solids between said bars.

10. Apparatus according to claim 9 in which the slats and bars are held in a single frame suspended from a plurality of hangers.

11. Apparatus according to claim 9 in which the hopper is circular in horizontal cross section.

12. Apparatus according to claim 9 in which the vibrator means is operable to vibrate the bottom closure with an amplitude of from $\frac{1}{60}''$ to $\frac{1}{16}''$.

References Cited in the file of this patent

UNITED STATES PATENTS

| | | |
|---|---|---|
| 1,895,601 | Beuthner | Jan. 31, 1933 |
| 2,642,206 | Reed | June 16, 1953 |
| 2,647,587 | Berg | Aug. 4, 1953 |
| 2,718,339 | Pankratz | Sept. 20, 1955 |

FOREIGN PATENTS

| | | |
|---|---|---|
| 529,691 | France | Dec. 3, 1921 |